United States Patent
Kuwana et al.

(10) Patent No.: US 9,612,173 B2
(45) Date of Patent: Apr. 4, 2017

(54) TRANSMISSION DEVICE

(71) Applicant: HITACHI, LTD., Tokyo (JP)

(72) Inventors: Ryo Kuwana, Tokyo (JP); Atsushi Fushimi, Tokyo (JP); Daisuke Shinma, Tokyo (JP); Hideki Hanami, Tokyo (JP); Isao Hara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 14/532,456

(22) Filed: Nov. 4, 2014

(65) Prior Publication Data

US 2015/0135842 A1    May 21, 2015

(30) Foreign Application Priority Data

Nov. 15, 2013  (JP) ................. 2013-236391

(51) Int. Cl.
*G01L 7/00* (2006.01)
*G01L 13/02* (2006.01)
(Continued)

(52) U.S. Cl.
CPC .............. *G01L 7/08* (2013.01); *G01L 13/026* (2013.01); *G01L 19/06* (2013.01)

(58) Field of Classification Search
CPC ....... G01L 13/00; G01L 13/02; G01L 13/026; G01L 7/08; G01L 7/00; G01L 19/00; G01L 19/06
See application file for complete search history.

(56) References Cited

U.S. PATENT DOCUMENTS 5,837,158 A    11/1998  Shepodd et al.
2006/0083896 A1*  4/2006  McKinnell ............. H01L 23/26
                                                                    428/141
(Continued)

FOREIGN PATENT DOCUMENTS

CN    202938959 U    5/2013
DE    2901636 A1 *  7/1980  ........... G01L 9/0041
(Continued)

OTHER PUBLICATIONS

Extended European Search Report received in corresponding European Application No. 14193100.6 dated Apr. 24, 2015.
(Continued)

*Primary Examiner* — Nguyen Ha
(74) *Attorney, Agent, or Firm* — Mattingly & Malur, PC (57) ABSTRACT

In a pressure and pressure difference transmitter that seals a sealing liquid for transmitting the pressure inside a pressure leading passage, the pressure and pressure difference transmitter forming a space between a diaphragm and a main body side wall surface, including the pressure leading passage connected to the main body side wall surface, and transmitting the pressure received by the diaphragm to a sensor through the sealing liquid sealed in the space and the pressure leading passage, a hydrogen occluding material for occluding hydrogen atoms of the sealing liquid is disposed at least in the sealing liquid, the main body side wall surface, or a part of a portion from the main body side wall surface to the sensor, with the hydrogen occluding material being formed with an uneven shape on the surface or being attached with a granular hydrogen occluding material.

7 Claims, 10 Drawing Sheets

(51) Int. Cl.
*G01L 7/08* (2006.01)
*G01L 19/06* (2006.01)

(56) References Cited

U.S. PATENT DOCUMENTS

2010/0083768 A1 4/2010 Hedtke et al.
2014/0096613 A1* 4/2014 Kuwana ............... G01L 13/026
73/716

FOREIGN PATENT DOCUMENTS

JP 2004-361159 A 12/2004
JP 2005-114453 A 4/2005

OTHER PUBLICATIONS

Chinese Office Action received in corresponding Chinese Application No. 201410645994.2 dated Aug. 1, 2016.

* cited by examiner

TRANSMISSION DEVICE

BACKGROUND OF THE INVENTION

The present invention relates to a transmission device, and relates more specifically to a transmission device suitable to measurement of the pressure or the pressure difference between two points of a fluid of a nuclear plant, oil refinery plant, chemical plant and the like and to transmission of the detected signal thereof.

The transmission device is for transmitting the pressure of a fluid received by a diaphragm to a sensor by a sealing liquid sealed in a pressure leading passage and transmitting the electric signal detected by the sensor to the outside, and there are two kinds of one measuring the absolute pressure and one measuring the pressure difference.

These pressure and pressure difference transmitters are used in a nuclear plant, oil refinery plant and the like, and, from the viewpoint of securing safety of the plant and securing the quality of the product, the accuracy of ±1% for example is required. However, due to the influence of hydrogen permeated from outside the pressure and pressure difference transmitter, it was difficult to maintain the accuracy for a long period of time.

More specifically, because a part of hydrogen (hydrogen molecule, hydrogen atom, hydrogen ion) contained in the measured fluid stays as bubbles in the sealing liquid filled in the pressure leading passage after permeating the diaphragm, by the effect thereof, the pressure inside the pressure leading passage rises, the change of the pressure applied to the diaphragm cannot be correctly transmitted to the sensor, and the measurement accuracy deteriorates.

Therefore, in the past, as described in JP-A-2005-114453 for example, hydrogen permeating the diaphragm of the pressure receiving section from the outside was suppressed by arranging a hydrogen occluding film on the sealing liquid side of the diaphragm. Also, a similar technology is described in JP-A-2004-361159.

However, according to the technologies described above, there were problems that the sealed amount was limited as a hydrogen occluding material and that, because the specific surface area was comparatively small, the effect of reducing the influence of hydrogen and a hydrocarbon group generated inside or hydrogen having permeated from the outside was not sufficient.

SUMMARY OF THE INVENTION

The object of the present invention is to provide a transmission device that can reduce the influence of hydrogen and a hydrocarbon group generated inside or hydrogen having permeated from the outside, and does not deteriorate ordinary pressure measurement accuracy.

In order to solve the problems, in the present invention, in a transmission device for pressure or pressure difference including a pressure receiving chamber, a diaphragm that constitutes a part of the pressure receiving chamber and a pressure leading passage that is connected to the pressure receiving chamber and transmitting pressure received by the diaphragm to a sensor through a sealing liquid sealed in a space of the pressure receiving chamber and the pressure leading passage, it is configured that a hydrogen occluding material that occludes hydrogen atoms of the sealing liquid is disposed at least in the sealing liquid, a wall surface of the pressure receiving chamber, or a part of a portion from the wall surface of the pressure receiving chamber to the sensor, and an uneven shape is formed on the surface of the hydrogen occluding material, or a granular hydrogen occluding material is attached to the occluding material.

According to the present invention, particularly, the influence of hydrogen and a hydrocarbon group generated inside or the influence of hydrogen having permeated from the outside can be reduced without deteriorating ordinary pressure transmission performance by effective occlusion by a hydrogen occluding material. In other words, the accuracy of the pressure and pressure difference transmitter can be maintained within an allowable error range for a long period of time, and the life of the pressure and pressure difference transmitter can be extended.

Other objects, features and advantages of the invention will become apparent from the following description of the embodiments of the invention taken in conjunction with the accompanying drawings.

DETAILED DESCRIPTION OF THE EMBODIMENTS

Below, embodiments of the present invention will be described. Now, the pressure and pressure difference transmitter in relation with the first embodiment will be described in detail referring to FIG. 1 to FIG. 9.

EXAMPLE 1

Figure 1:
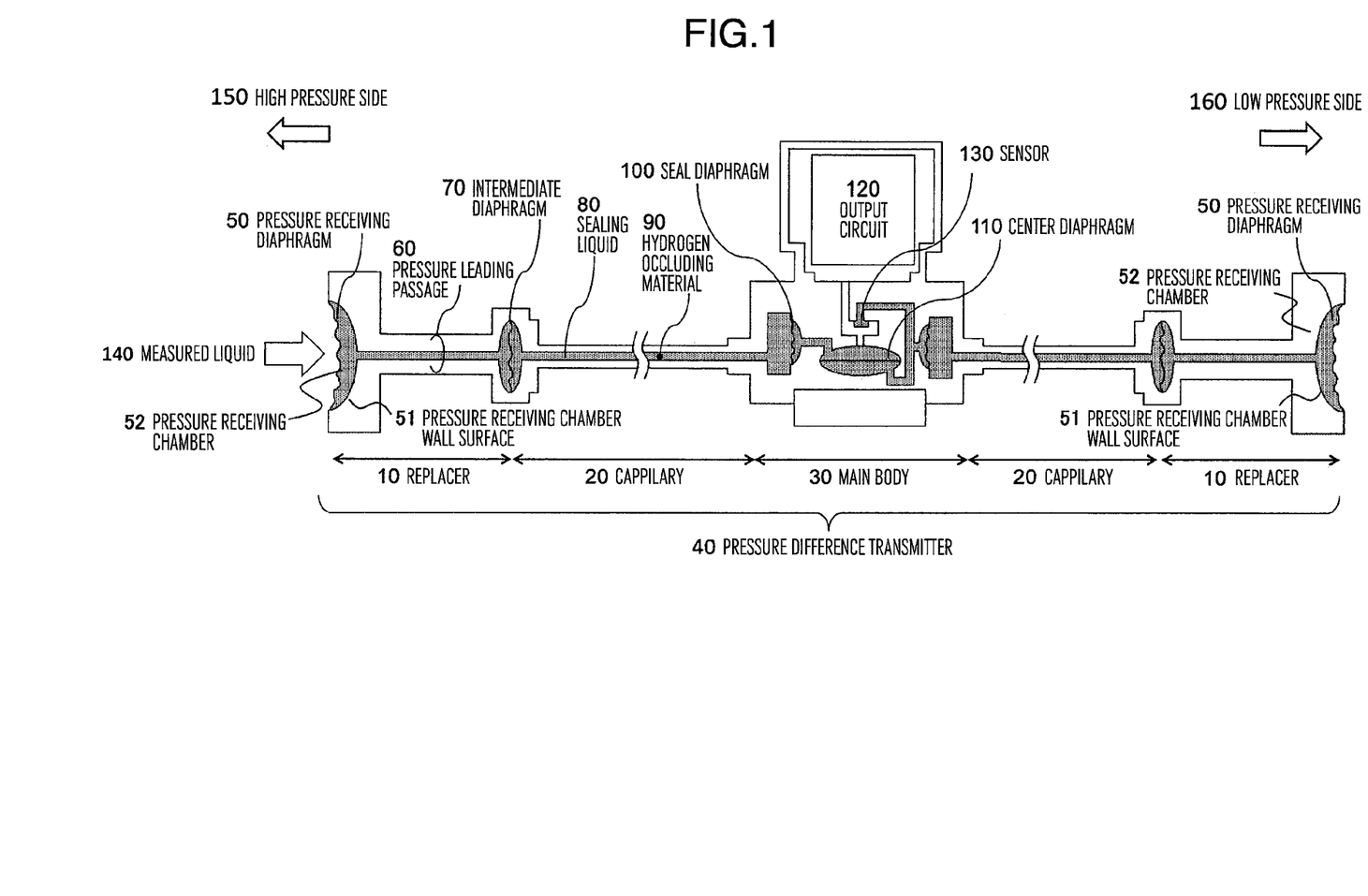
FIG. 1 is an explanatory drawing for a pressure difference transmitter in the pressure and pressure difference transmitter in relation with the first embodiment of the present invention.

FIG. 1 is an explanatory drawing for a pressure difference transmitter in the pressure and pressure difference transmitter in relation with the first embodiment of the present invention.

In FIG. 1, a pressure difference transmitter 40 for measuring the pressure difference is formed of replacers 10, capillaries 20 and a main body 30. The pressure of a measured fluid 140 is received by two pressure receiving diaphragms 50, and the pressure is transmitted to a sensor 130 by a sealing liquid 80 sealed in pressure leading passages 60 through intermediate diaphragms 70, seal diaphragms 100 and a center diaphragm 110. The pressure received by the sensor 130 is inputted to an output circuit 120 and outputs a pressure value.

Here, the replacer 10 will be described. A pressure receiving chamber 52 is formed so as to be surrounded by the pressure receiving diaphragm 50 and a pressure receiving chamber wall surface 51. The pressure of the measured liquid 140 is received first by the pressure receiving diaphragm 50, is transmitted to the sealing liquid stored in the pressure receiving chamber 52, and is transmitted further to the sealing liquid in the pressure leading passage 60. Although the intermediate diaphragm 70 is arranged between the pressure receiving diaphragm 50 and the seal diaphragm 100 in the drawing, it may be configured that a plurality of the intermediate diaphragms 70 are arranged and the sealing liquid is sealed between these plurality of the intermediate diaphragms 70.

Further, although detailed description will be omitted, this concept with respect to the pressure receiving diaphragm 50 that the pressure receiving chamber is formed by the diaphragm and the pressure receiving chamber wall surface is applied to the intermediate diaphragm 70 and the seal diaphragm 100 also.

In the configuration described above, all of the positions where the sealing liquid is sealed not only between the pressure receiving diaphragm 50 and the intermediate diaphragm 70 but also between respective portions of the intermediate diaphragm 70, the seal diaphragm 100, the center diaphragm 110, and the sensor 130 are the pressure leading passage 60.

In the configuration described above, it is known that the internal pressure of the pressure leading passage 60 rises by that hydrogen having permeated from outside the pressure difference transmitter 40 is made into bubbles in the sealing liquid, the change of the pressure applied to the pressure receiving diaphragm 50 cannot be transmitted correctly to the sensor 130, and the measurement accuracy deteriorates. More specifically, when the amount of the gas made into bubbles inside the pressure leading passages 60 on the high pressure side 150 and the low pressure side 160 are different from each other, the pressure value deviates from a normal value.

Also, it was known as a new problem that, even when hydrogen and a hydrocarbon group were generated and were made into bubbles in the inside due to radiolysis of the sealing liquid, the pressure inside the pressure leading passage 60 rose, and the detection accuracy of the sensor 130 deteriorated. Further, the hydrocarbon group is methane, ethane, propane, and the like.

These hydrogen permeated from the outside or hydrogen and a hydrocarbon group generated in the inside are made into bubbles when the amount of them exceeds the dissolving amount of the sealing liquid 80 inside the pressure leading passage 60. Also, as the pressure of the measuring object of the transmission device is near vacuum, the dissolving amount reduces, and therefore such phenomenon appears conspicuously.

In the configuration described above in the pressure and pressure difference transmitter 40, by occluding both of hydrogen permeated from the outside of the pressure difference transmitter 40 or hydrogen generated in the inside and hydrogen atoms in a hydrocarbon group by a hydrogen occluding material 90 sealed inside the pressure leading passage 60 or provided on the inner wall surface of the pressure leading passage 60, the pressure rise inside the pressure leading passage 60 caused by accumulation of hydrogen and a hydrocarbon group as bubbles can be prevented. Here, the pressure leading passage 60 means a portion between two pressure receiving diaphragms 50 where the sealing liquid 80 is sealed, and is shown by hatching in FIG. 1.

The hydrogen occluding material described above can be granular, but there is a risk of deteriorating the ordinary performance by settling inside the pressure leading passage. Further, although it may be wire-like, plate-like, or plating-like, the amount that can be sealed therein is less compared to the powder, the specific surface area is small, and therefore there is a risk that the bubble suppressing effect cannot be secured sufficiently. Therefore, by arranging an uneven shape or attaching an annular hydrogen occluding material on the surface of the wire-like or plate-like hydrogen occluding material and so on, the bubble suppressing effect is secured sufficiently without deteriorating the ordinary performance. The detail thereof will be described in FIG. 7 and onward.

Figure 2:
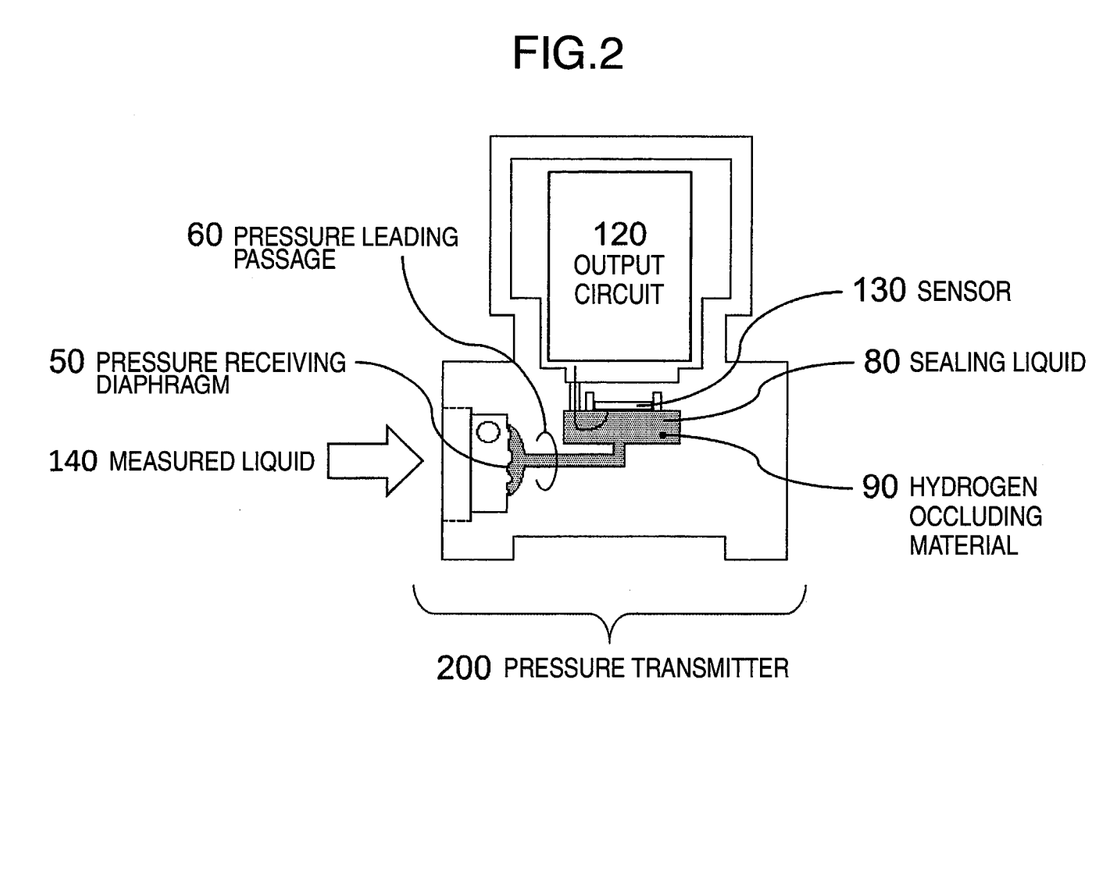
FIG. 2 is an explanatory drawing for a pressure transmitter.

FIG. 2 shows an explanatory drawing for a pressure transmitter. In FIG. 2, a pressure transmitter 200 for measuring the absolute pressure receives the pressure of the measured liquid 140 by the pressure receiving diaphragm 50, and the pressure is transmitted to the sensor 130 by the sealing liquid 80 sealed in the pressure leading passage 60. The pressure received by the sensor 130 is inputted to the output circuit 120 and is outputted as a pressure value.

In the configuration described above, in the pressure transmitter 200, similarly to FIG. 1, when hydrogen permeated from outside the pressure transmitter 200 or hydrogen and a hydrocarbon group generated inside are made into bubbles, the pressure inside the pressure leading passage 60 deviates from a normal value. Here, similarly to FIG. 1, by occluding both of hydrogen and hydrogen atoms in a hydrocarbon group by the hydrogen occluding material 90 sealed inside the pressure leading passage 60 or provided on the inner wall surface of the pressure leading passage 60, the pressure rise inside the pressure leading passage 60 caused by that hydrogen and a hydrocarbon group are made into bubbles can be prevented.

Figure 3:
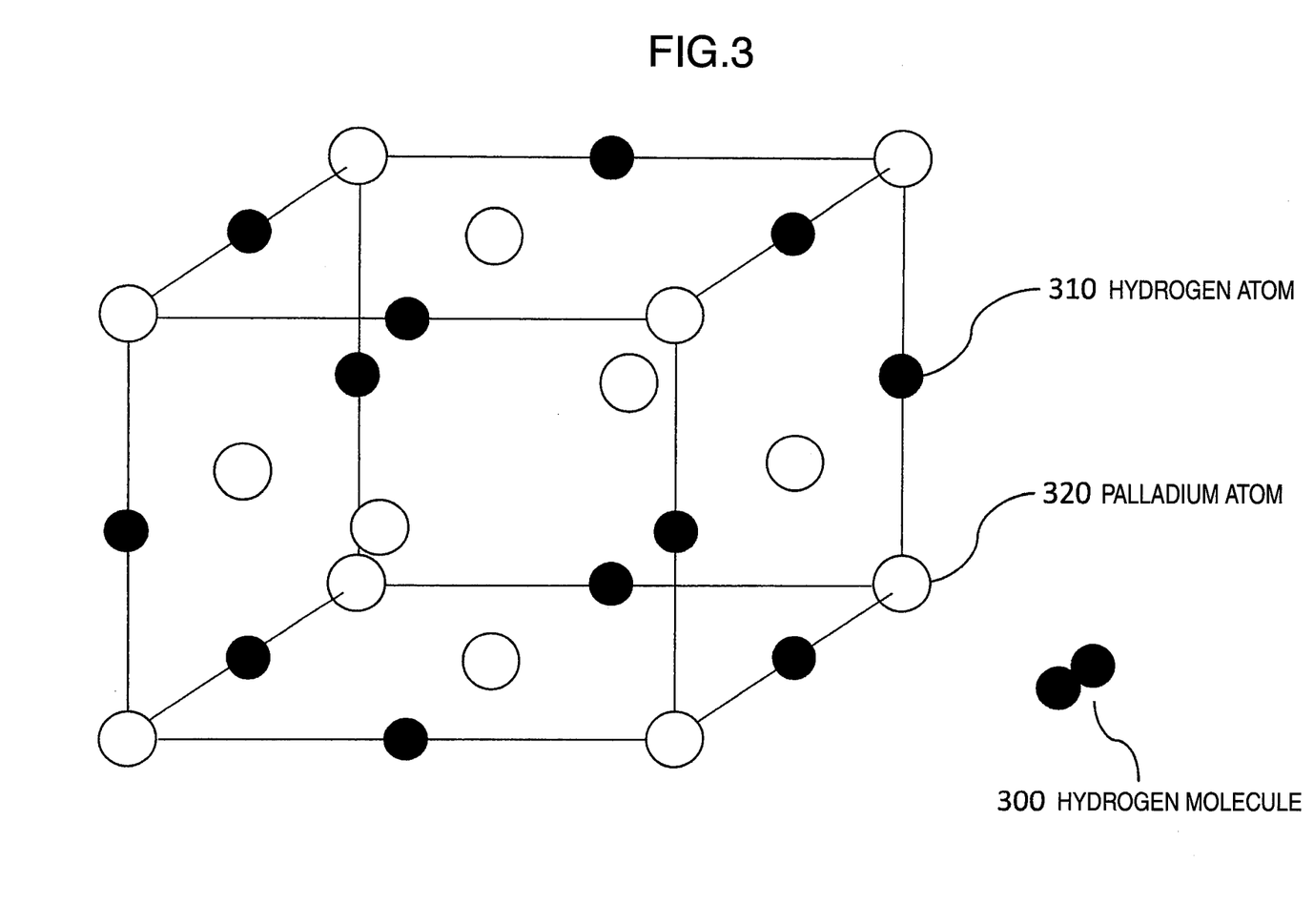
FIG. 3 is an explanatory drawing showing a method for occluding hydrogen by a hydrogen occluding material.

FIG. 3 shows the hydrogen occlusion effect by the hydrogen occluding material. In FIG. 3, an image drawing of hydrogen occlusion by palladium is shown as an example of the hydrogen occluding material 90. Also, the hydrogen occluding material 90 may be of magnesium, vanadium, titanium, manganese, zirconium, nickel, niobium, cobalt, calcium, or an alloy thereof other than palladium.

Palladium is of a face centered cubic lattice, and a hydrogen molecule 300 is occluded between palladium atoms 320 as hydrogen atoms 310. Also, it is known that palladium occludes hydrogen having 935 times of the volume of itself.

Figure 4:
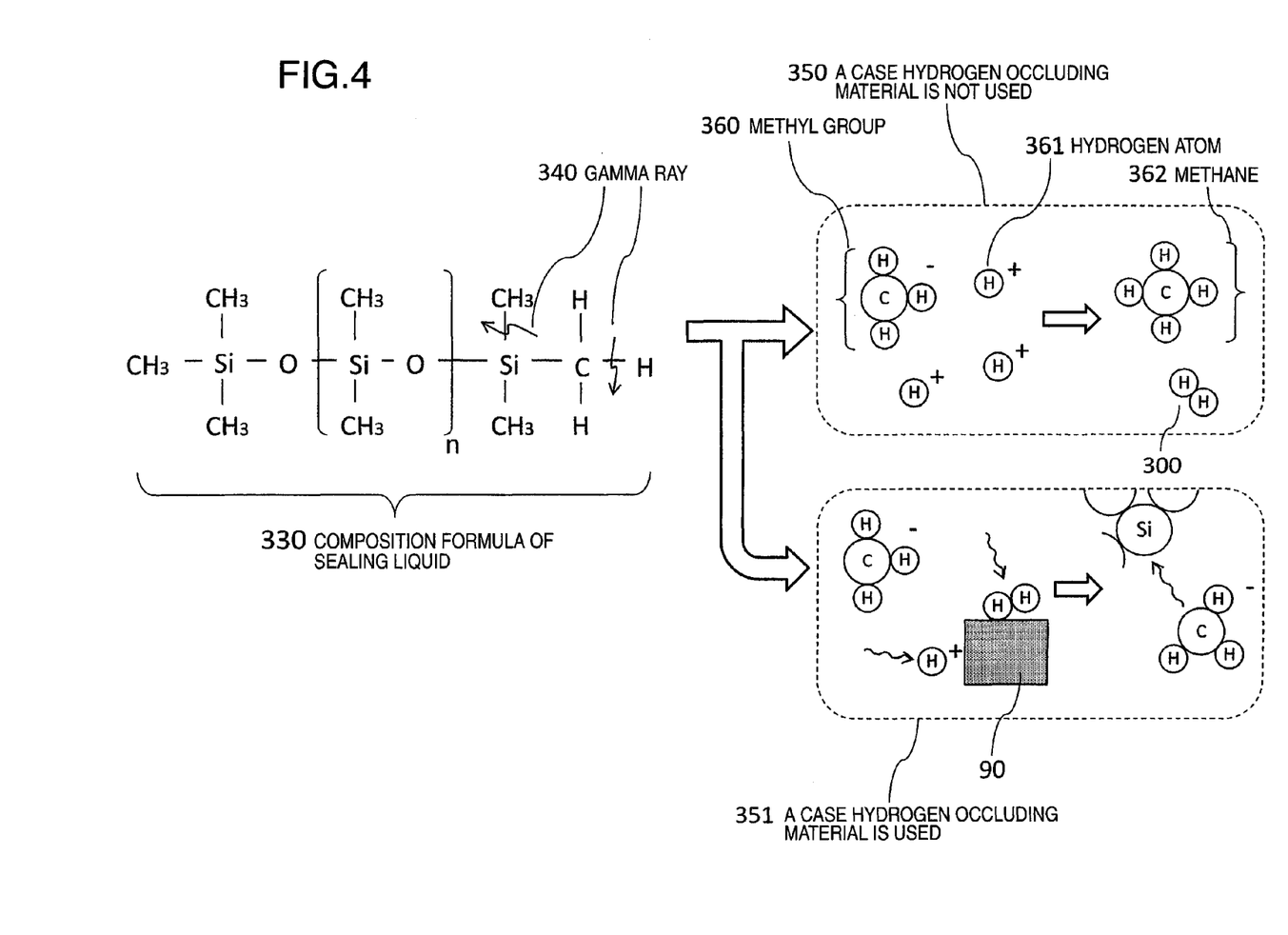
FIG. 4 is an explanatory drawing showing a method for occluding hydrogen by a hydrogen occluding material, the hydrogen being generated by radiolysis of a sealing liquid.

FIG. 4 shows an explanatory drawing of a method for occluding hydrogen by a hydrogen occluding material, the hydrogen being generated by radiolysis of the sealing liquid 80. In FIG. 4, as an example, methane 362 and the hydrogen molecule 300 will be described. With respect to the sealing liquid 80, by a radioactive ray such as a gamma ray 340 and the like, bonding of C and H and bonding of Si and C in a composition formula 330 of the sealing liquid are disengaged. A methyl group 360, a hydrogen atom 361 and the like generated thereby bond to each other and become a hydrocarbon group such as methane 362 and the like and a hydrogen molecule 300 in a case that a hydrogen occluding material is not used 350.

On the other hand, in a case that a hydrogen occluding material is used 351, because the hydrogen atom 361 generated by radiolysis is occluded by the hydrogen occluding material 90, the amount of the methyl group 360 bonding to the hydrogen atoms 361 reduces, and therefore the generation amount of the methane 362 can be suppressed. The methyl group 360 not boding to the hydrogen atom 361 returns to the sealing liquid again. Thereby, the pressure rise inside the pressure leading passage 60 caused by accumulation of the hydrocarbon group such as the methane 362 as the bubbles can be prevented.

Figure 5:
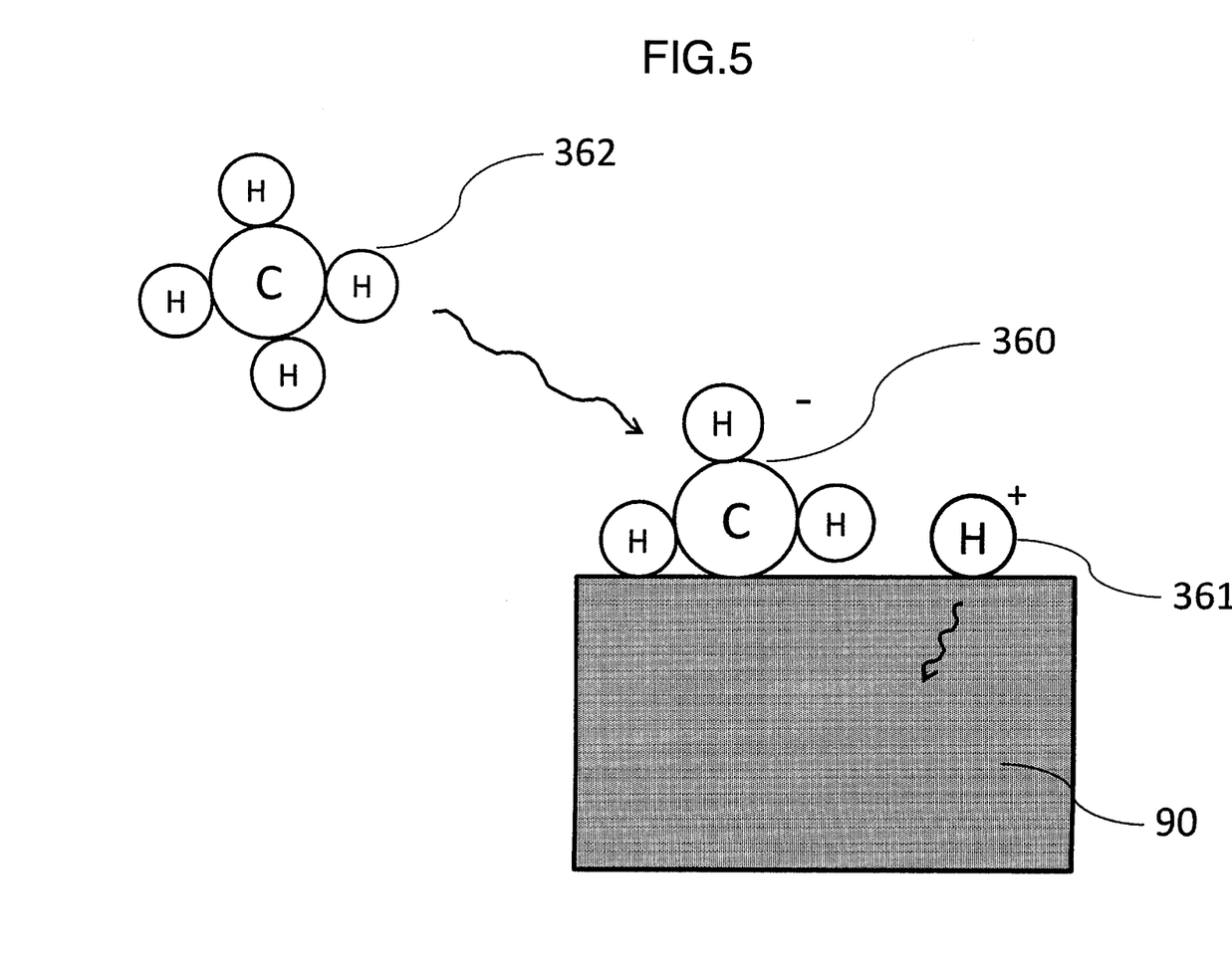
FIG. 5 is an explanatory drawing showing a method for occluding hydrogen atoms in a hydrocarbon group by a hydrogen occluding material.

Otherwise, as a method for occluding hydrogen atoms in a hydrocarbon group by a hydrogen occluding material, an explanatory drawing is shown in FIG. 5. In FIG. 5, the methane 362 is described as an example. The methyl group 360 and a part of the hydrogen atoms 361 generated by radiolysis bond to each other and become the methane 362. Thereafter, when the methane 362 contacts the surface of the hydrogen occluding material 90, the methane 362 is dissociated to the methyl group 360 and the hydrogen atoms 361. The hydrogen atoms 361 are occluded by the hydrogen occluding material 90, and the methyl group 360 eventually becomes carbon atoms and are adsorbed to the surface of the hydrogen occluding material. Thereby, the pressure rise inside the pressure leading passage 60 caused by accumulation of the hydrocarbon group such as the methane 362 as the bubbles can be prevented.

By arranging such the hydrogen occluding material 90 inside the pressure leading passage 60 or on the wall surface of the pressure and pressure difference transmitter, hydrogen permeated from outside the pressure and pressure difference transmitter or hydrogen generated inside and hydrogen atoms in a hydrocarbon group can be occluded up to the amount of 935 times at the maximum of the volume of themselves, and therefore the rise of the internal pressure by that hydrogen and a hydrocarbon group are made into bubbles inside the pressure leading passage can be suppressed.

Figure 6:
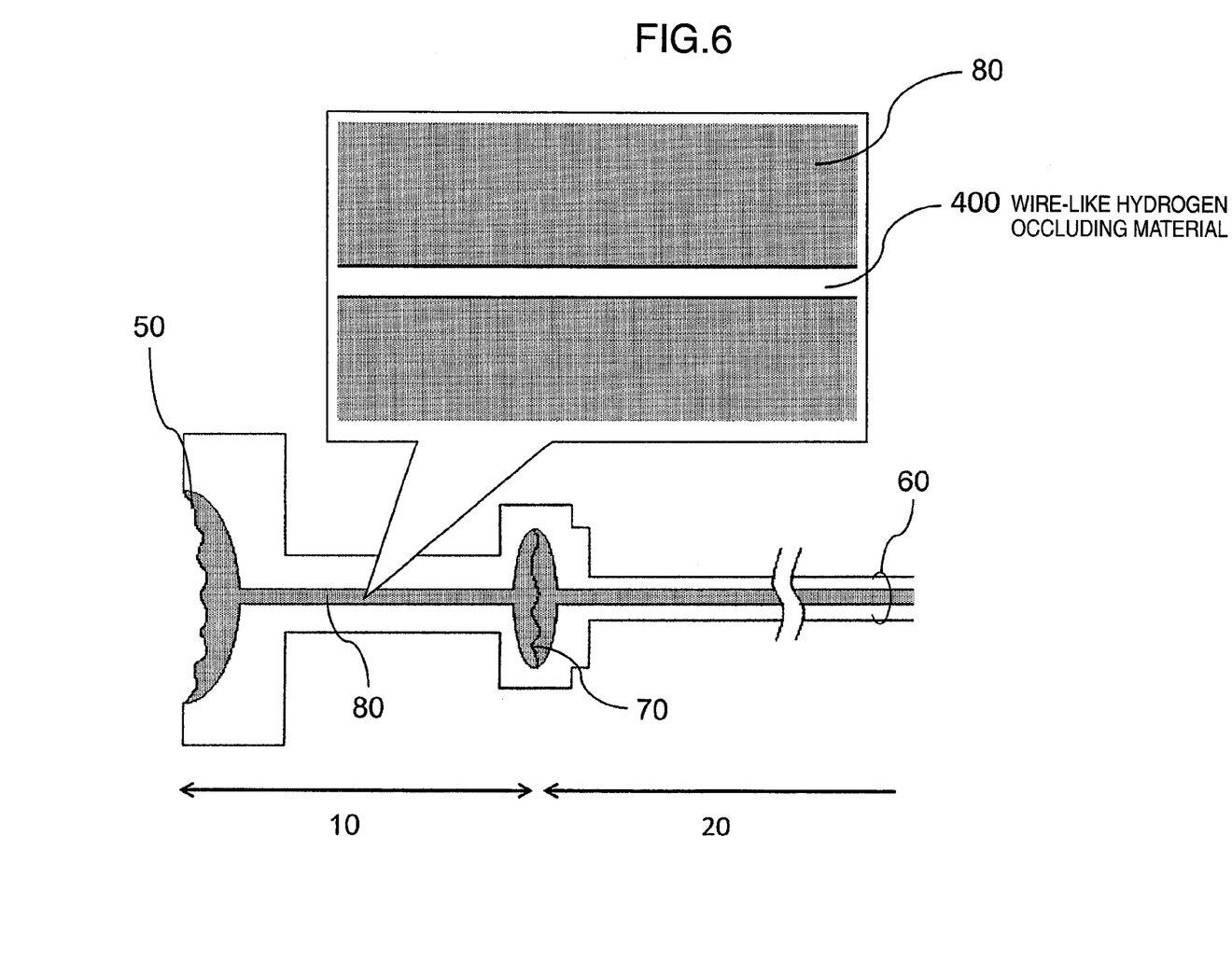
FIG. 6 is an explanatory drawing for a difference pressure transmitter that uses a wire-like hydrogen occluding material.

FIG. 6 shows a pressure difference transmitter that uses a wire-like hydrogen occluding material. Although the sealing position of the wire-like hydrogen occluding material 400 is preferable to be the respective pressure leading passages 60 of the replacers 10, the capillaries 20 and the main body 30, it may be only the replacers 10, or otherwise it may be only the replacers 10 and the capillaries 20. In the pressure transmitter 200 also, similarly to the pressure difference transmitter 40, the wire-like hydrogen occluding material 400 is sealed inside the pressure leading passage 60. This wire-like hydrogen occluding material 400 may be pellet-like, plate-like, or spherical.

By this wire-like hydrogen occluding material 400, hydrogen permeated from outside the pressure and pressure difference transmitter or hydrogen generated inside and hydrogen atoms in a hydrocarbon group can be occluded, and the rise of the internal pressure by that hydrogen and a hydrocarbon group are made into bubbles inside the pressure leading passage can be suppressed.

However, because the pressure receiving chamber 51 and the pressure leading passage 60 are narrow, there is a risk that an amount of the wire-like hydrogen occluding material 400 sufficient for suppressing the bubbles accumulating inside the transmitter cannot be sealed. Also, because the specific surface area is smaller than that of the powder-like hydrogen occluding material, it takes time for suppressing bubbling. This is similar also with respect to the pellet-like, plate-like and spherical hydrogen occluding material.

Although there is a method of sealing the powder-like hydrogen occluding material which has the specific surface area wider than that of the wire-like one, as described in the problems to be solved, there is a risk that the pressure measurement accuracy deteriorates by settling. In order to bring the bubble suppressing effect close to that of the powder-like hydrogen occluding material without deteriorating the pressure measurement accuracy, it is possible to arrange an uneven shape on the surface of the wire-like hydrogen occluding material and to attach powder. This is similar also with respect to the pellet-like, plate-like and spherical hydrogen occluding material.

Figure 7:
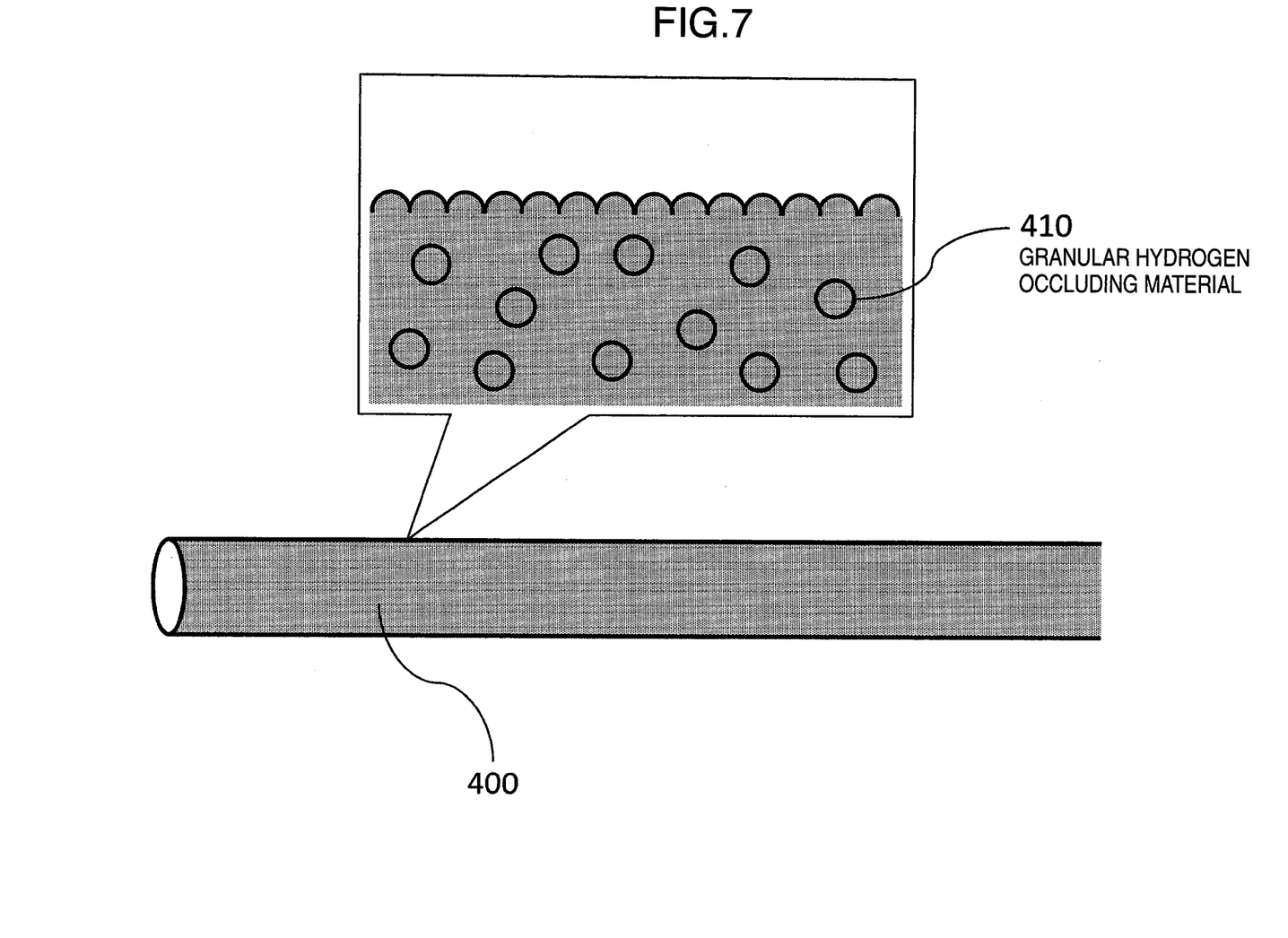
FIG. 7 is an explanatory drawing for a wire-like hydrogen occluding material attached with a granular hydrogen occluding material on the surface.

FIG. 7 shows a wire-like hydrogen occluding material attached with a granular hydrogen occluding material on the surface. A method for attaching the granular hydrogen occluding material 410 to the wire-like hydrogen occluding material 400 may be vapor deposition, sputtering, crimping, adhering by adhesives, and precipitating onto the surface by plating treatment. However, in the case of plating treatment, because the hydrogen occluding material occludes hydrogen generated during the process, it is necessary to execute a reducing treatment. This wire-like hydrogen occluding material 400 may be pellet-like, plate-like, or spherical.

By the wire-like hydrogen occluding material 400 attached with this granular hydrogen occluding material, the hydrogen occlusion amount and the bubble suppressing time can be increased more than the wire-like hydrogen occluding material 400 without deteriorating the normal measurement accuracy of the pressure and pressure difference transmitter.

Figure 8:
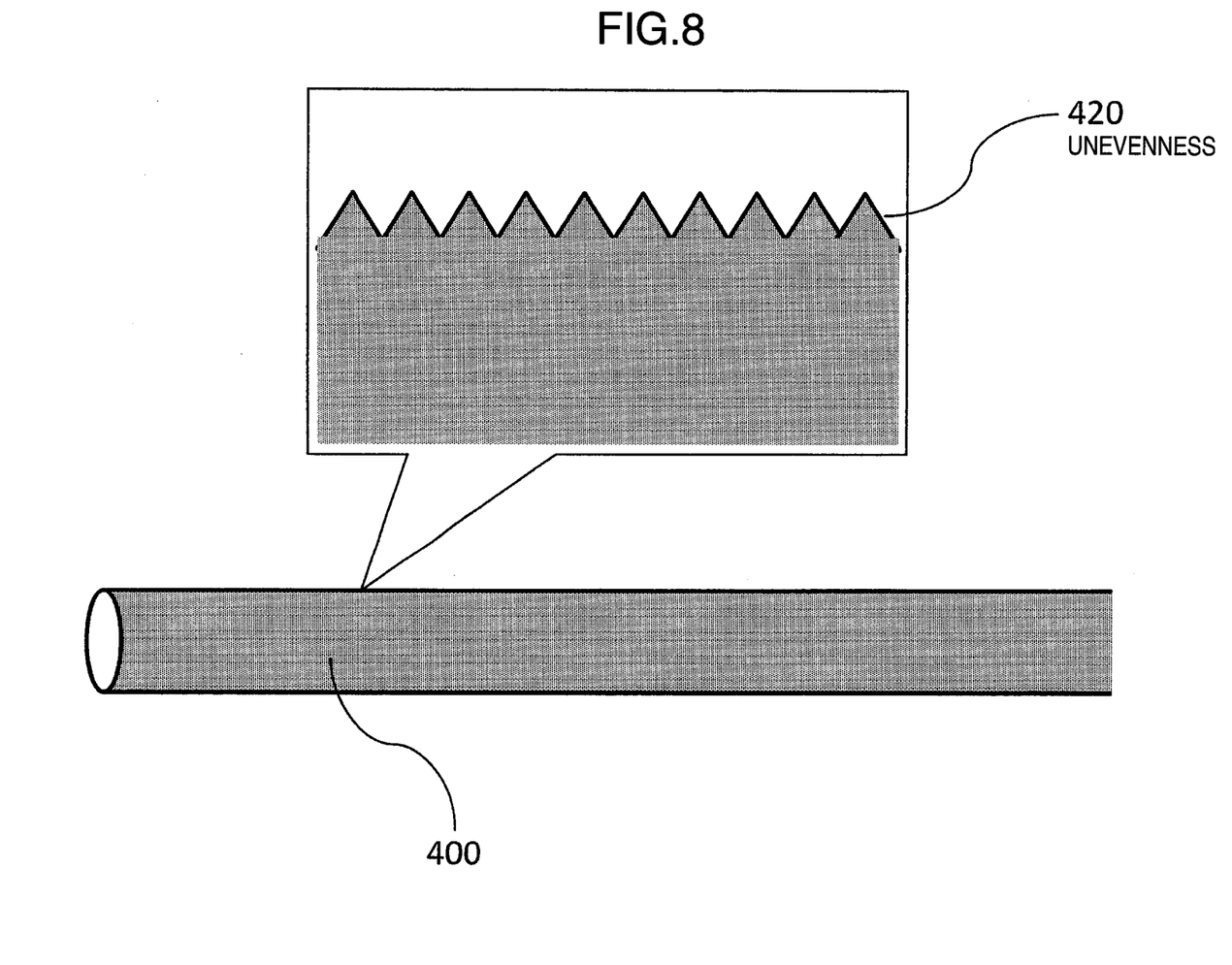
FIG. 8 is an explanatory drawing for a wire-like hydrogen occluding material in which an uneven shape is arranged on the surface.

FIG. 8 shows a wire-like hydrogen occluding material in which an uneven shape is arranged on the surface. A method for arranging unevenness 420 on the wire-like hydrogen occluding material 400 may be polishing the surface by a file and a sand paper, and may be arranging the unevenness on the surface by sand blasting. This wire-like hydrogen occluding material 400 may be pellet-like, plate-like, or spherical.

By the wire-like hydrogen occluding material 400 in which an uneven shape is arranged on the surface, the hydrogen occlusion amount and the bubble suppressing time can be increased more than the wire-like hydrogen occluding material 400 without deteriorating the normal measurement accuracy of the pressure and pressure difference transmitter. This working of arranging unevenness on the surface can suppress the cost lower than a method of attaching the granular hydrogen occluding material on the surface shown in FIG. 7.

Figure 9:
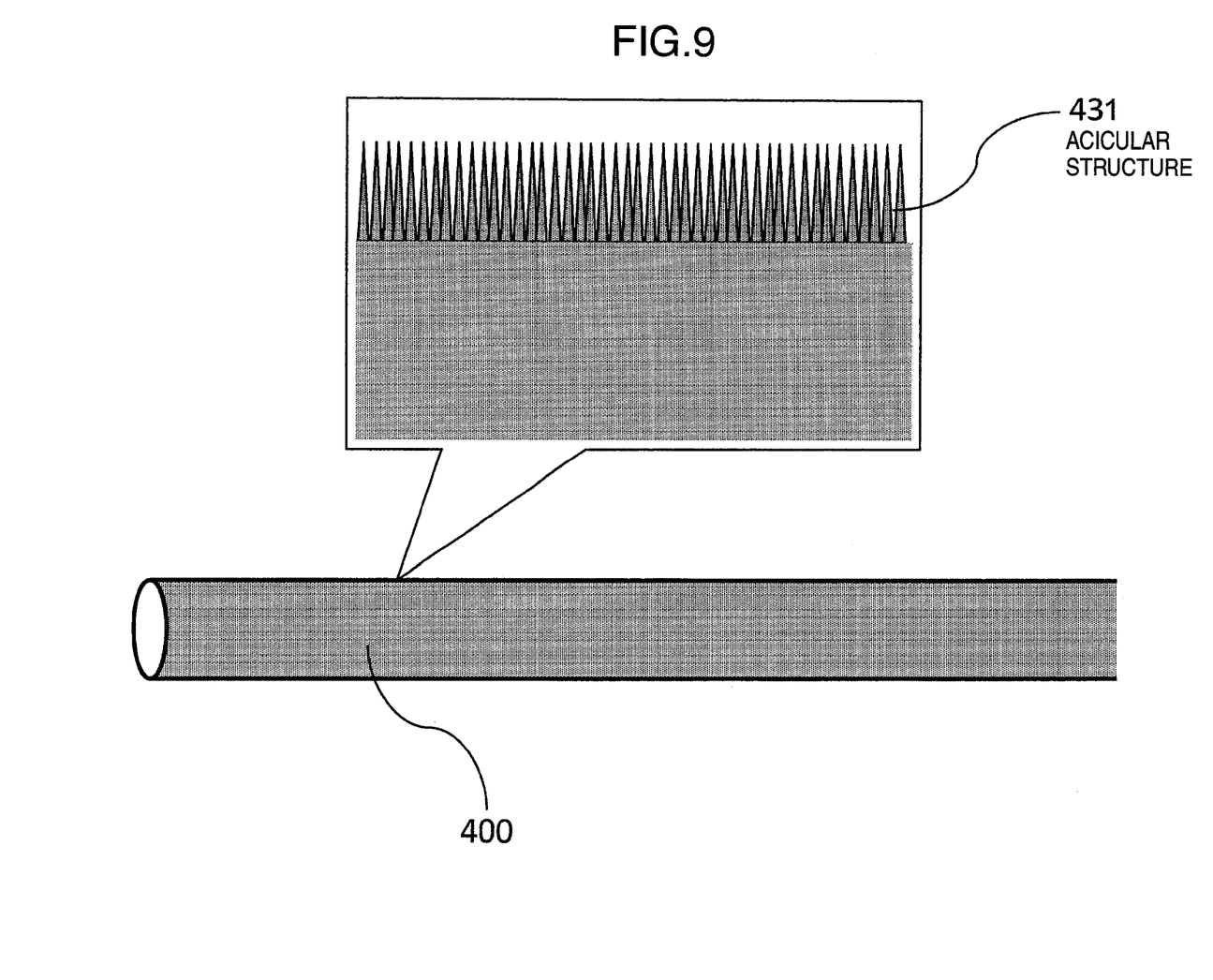
FIG. 9 is an explanatory drawing for a wire-like hydrogen occluding material in which an acicular shape structure is arranged on the surface.

FIG. 9 shows a wire-like hydrogen occluding material in which an acicular structure is arranged on the surface. A method for arranging an acicular structure 431 in the wire-like hydrogen occluding material 400 may also be a method by a chemical reaction such as a blackening treatment for example. This wire-like hydrogen occluding material 400 may be pellet-like, plate-like, or spherical.

By the wire-like hydrogen occluding material 400 in which an acicular structure is arranged on the surface, the hydrogen occlusion amount and the bubble suppressing time can be increased more than the wire-like hydrogen occluding material 400 without deteriorating the normal measurement accuracy of the pressure and pressure difference transmitter. The present acicular structure can make the specific surface area wider than those of FIG. 7 and FIG. 8, and the hydrogen occlusion amount and the bubble suppressing time of a same degree of the granular hydrogen occluding material can be secured.

Figure 10:
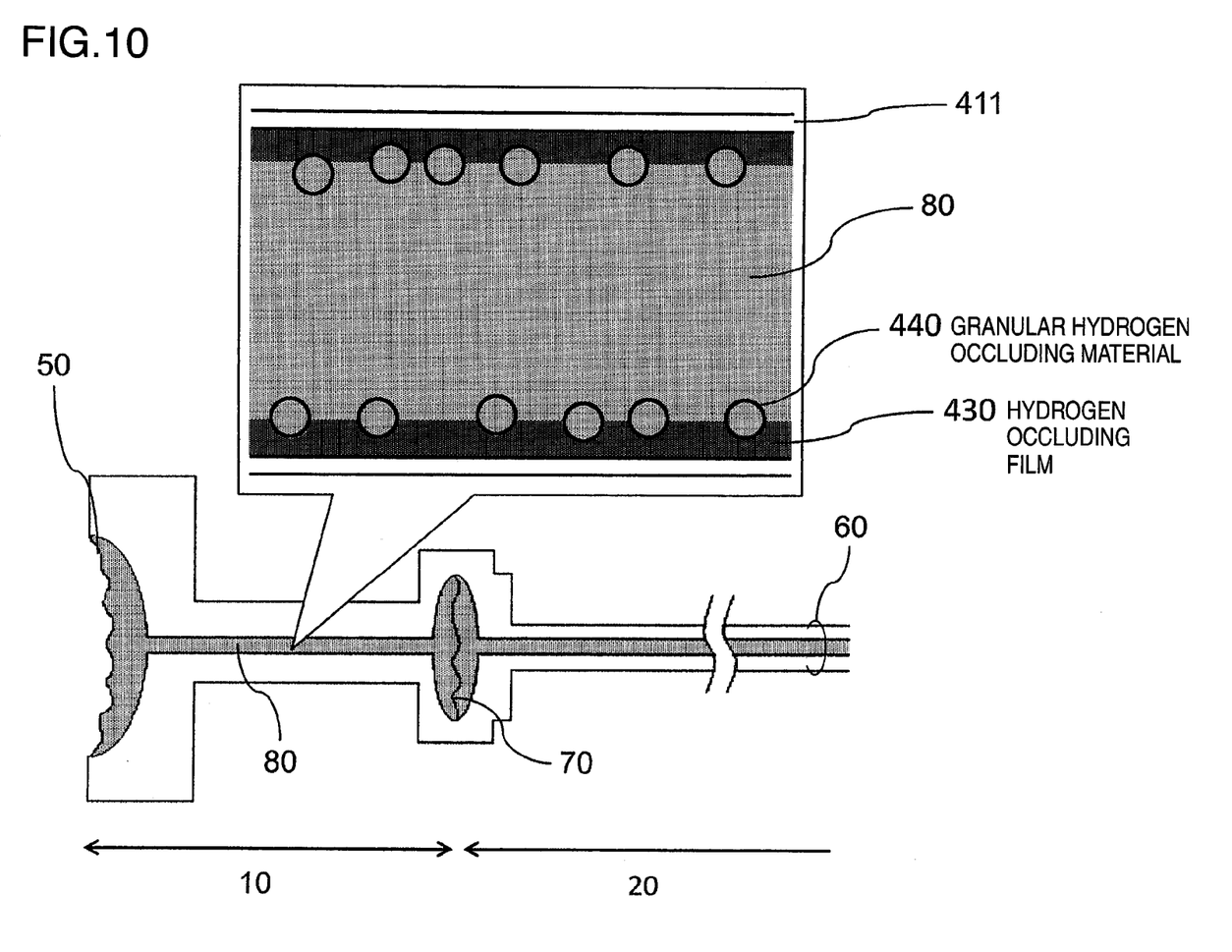
FIG. 10 is an explanatory drawing in which a hydrogen occluding film is provided with a hydrogen occluding material.

Further, another example will be described. In FIG. 10, according to the present example, a hydrogen occluding film 430 is provided on a pressure leading passage wall surface 411 as a hydrogen occluding material. The hydrogen occluding material is provided on the pressure leading passage wall surface. By plating or sputtering the hydrogen occluding material on the pressure leading passage wall surface 411, the hydrogen occluding film 430 is formed on the pressure leading passage wall surface 411.

Also, a granular hydrogen occluding material 440 is attached further to the surface of the hydrogen occluding film 430. The granular hydrogen occluding material 440 can be attached to the hydrogen occluding film 430 by vapor deposition, sputtering, crimping, adhering by adhesives, and precipitating onto the surface by plating treatment.

Thus, by occluding hydrogen permeated from outside the pressure transmitter 40 or hydrogen generated inside and hydrogen atoms in a hydrocarbon group by the hydrogen occluding film 430 and the granular hydrogen occluding material 440, the pressure rise inside the pressure leading passage 60 caused by that hydrogen and a hydrocarbon group are made into bubbles can be prevented. In other words, by the hydrogen occluding film 430 attached with the granular hydrogen occluding material 440, the hydrogen occlusion amount and the bubble suppressing time can be increased without deteriorating the normal measurement accuracy of the pressure and pressure difference transmitter.

In the configuration described above, although it is preferable to plate or sputter the hydrogen occluding film 430 and the granular hydrogen occluding material 440 to the respective pressure leading passage wall surfaces 411 of the replacers 10, the capillaries 20 and the main body 30 of the pressure and pressure difference transmitter 40, it may be only the replacers 10, or otherwise it may be only the replacers 10 and the capillaries 20.

Other than the above, the position of plating and sputtering described above may also be a position of the main body side of the pressure receiving diaphragm 50, the pressure receiving side wall surface of the intermediate diaphragm 70 and the main body side wall surface of the intermediate diaphragm 70, or a combination thereof, and may be a position of the sealing liquid side of the pressure receiving diaphragm 50, the pressure receiving side and the main body side of the intermediate diaphragm 70, the pressure receiving side and the main body side of the seal diaphragm 100 and the pressure receiving side and the main body side of the center diaphragm 110, or a combination thereof.

Further, in the present example, the granular hydrogen occluding material 440 was attached to the surface of the hydrogen occluding film 430, however, instead of attaching the granular hydrogen occluding material 440, as the examples shown in FIG. 8 and FIG. 9, an uneven shape may be provided on the surface of the hydrogen occluding film 430. Furthermore, it is also possible to provide the uneven shape and to further attach the granular hydrogen occluding material 440.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A transmission device for pressure or pressure difference comprising:
   a pressure receiving chamber, a first diaphragm that constitutes a part of the pressure receiving chamber and a pressure leading passage that is connected to the pressure receiving chamber and transmitting pressure received by the first diaphragm to a sensor through a sealing liquid sealed in a space of the pressure receiving chamber and the pressure leading passage,
   wherein a hydrogen occluding material that occludes hydrogen atoms of the sealing liquid is disposed in the sealing liquid and the hydrogen occluding material is a metallic wire-shaped hydrogen occluding material, and
   wherein a granular hydrogen occluding material is attached to the wire-shaped hydrogen occluding material.

2. The transmission device according to claim 1, wherein wherein the hydrogen occluding material is sealed, or attached, or sealed and attached in the inside of the pressure leading passage.

3. The transmission device according to claim 1, wherein hydrogen intruded from the outside of the transmission device is occluded or hydrogen atoms generated in the inside are occluded by the hydrogen occluding material.

4. The transmission device according to claim 1, wherein the hydrogen occluding material is palladium, magnesium, vanadium, titanium, manganese, zirconium, nickel, niobium, cobalt, calcium, or an alloy thereof.

5. The transmission device according to claim 1, wherein the hydrogen occluding material is pellet like, plate-like or spherical.

6. The transmission device according to claim 1, further comprising:
   a second diaphragm which is arranged between the first diaphragm and the sensor in the pressure leading passage that receives the pressure from the first diaphragm,
   wherein the first diaphragm is arranged to receive the pressure of a measured liquid and transmit the pressure through the pressure leading passage to the second diaphragm,
   wherein the sealing liquid is configured to transmit the pressure received by the first diaphragm and to transmit the pressure received by the second diaphragm; and
   wherein the hydrogen occluding material is arranged in any of the inside of the pressure leading passage, the sealing liquid side of the first diaphragm, and the second diaphragm, or a combination thereof.

7. The transmission device according to claim 6, further comprising:
   a third diaphragm and a fourth diaphragm arranged in the pressure leading passage between the first diaphragm and the second diaphragm,
   wherein the hydrogen occluding material is arranged at a position of any of the pressure receiving side of the third diaphragm, the sealing liquid side of the third diaphragm, the pressure receiving side of the fourth diaphragm or the sealing liquid side of the fourth diaphragm, or a combination thereof.

* * * * *